US008848225B2

(12) United States Patent  (10) Patent No.: US 8,848,225 B2
Kurihara  (45) Date of Patent: Sep. 30, 2014

(54) IMAGE FORMING APPARATUS FOR DETERMINING WHETHER IMAGES ARE NORMALLY FORMED IN A SET OF PAGES BASED ON A COMPARISON RESULT BETWEEN STORED PROCESSING RESULTS, AND IMAGE FORMING SYSTEM AND NON-TRANSITORY COMPUTER READABLE RECORDING MEDIUM

(75) Inventor: Susumu Kurihara, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 163 days.

(21) Appl. No.: 13/489,887

(22) Filed: Jun. 6, 2012

(65) Prior Publication Data

US 2012/0314253 A1 Dec. 13, 2012

(30) Foreign Application Priority Data

Jun. 7, 2011 (JP) ................................. 2011-127618

(51) Int. Cl.
  *G06F 3/12* (2006.01)
  *H04N 1/00* (2006.01)
  *H04N 1/32* (2006.01)

(52) U.S. Cl.
  CPC .... *H04N 1/00005* (2013.01); *H04N 2201/3242* (2013.01); *H04N 1/00068* (2013.01); *H04N 1/0009* (2013.01); *H04N 1/0005* (2013.01); *H04N 1/00076* (2013.01); *H04N 1/32128* (2013.01); *H04N 2201/3284* (2013.01); *H04N 2201/3277* (2013.01); *H04N 1/00029* (2013.01); *H04N 1/00042* (2013.01); *H04N 1/00047* (2013.01); *H04N 1/00084* (2013.01); *H04N 1/00015* (2013.01)
  USPC ......... 358/1.15; 358/1.1; 358/1.13; 358/1.14; 358/1.16

(58) Field of Classification Search
  CPC .... G03F 1/44; G03F 1/84; G06T 2207/30168
  USPC ....................... 358/1.1, 1.15, 1.13, 1.14, 1.16
  See application file for complete search history.

(56) References Cited

U.S. PATENT DOCUMENTS 5,255,106 A * 10/1993 Castro ........................... 358/400
8,009,307 B2 * 8/2011 Shutt et al. .................... 358/1.15

(Continued)

FOREIGN PATENT DOCUMENTS

JP 2006-015593 1/2006
JP 2007-189315 7/2007

(Continued)

OTHER PUBLICATIONS

Office Actionin corresponding Japanese patent application No. Tokugan 2011-127618 mailed Aug. 14, 2013.

(Continued)

*Primary Examiner* — Dennis Dicker
(74) *Attorney, Agent, or Firm* — Holtz Holtz Goodman & Chick PC

(57) ABSTRACT

An image forming apparatus for outputting a plurality of sets of output units, the output unit composed of a plurality of pages with a determined order being one set, includes an image forming unit for successively forming images corresponding to the respective pages on sheets, a control unit for performing an arithmetic processing of an image eigenvalue for each output unit, a first storage storing the result of the arithmetic processing performed for one specific set of output unit, and a second storage storing the result of the arithmetic processing performed for the nth set of output unit, wherein the control unit determines whether or not the images are normally formed on the sheets for the nth set of output unit based on a comparison result between the result of the arithmetic processing stored in the first storage and that of the arithmetic processing stored in the second storage.

21 Claims, 16 Drawing Sheets

(56) References Cited

U.S. PATENT DOCUMENTS

| | | | |
|---|---|---|---|
| 8,520,190 B2 * | 8/2013 | Arai ............................... | 355/77 |
| 2005/0111021 A1 * | 5/2005 | Payne et al. .................. | 358/1.12 |
| 2006/0033951 A1 * | 2/2006 | Chang et al. ................. | 358/1.15 |
| 2006/0126093 A1 * | 6/2006 | Fedorovskaya et al. ..... | 358/1.14 |
| 2011/0149331 A1 * | 6/2011 | Duggan et al. ............... | 358/1.14 |
| 2012/0245877 A1 * | 9/2012 | Handa ........................... | 702/95 |
| 2012/0245887 A1 * | 9/2012 | Spears et al. ................. | 702/179 |

FOREIGN PATENT DOCUMENTS

| | | |
|---|---|---|
| JP | 2007-260996 | 10/2007 |
| JP | 2008-052349 | 3/2008 |
| JP | 2009-248319 | 10/2009 |

OTHER PUBLICATIONS

Office Action in corresponding Japanese patent application No. Tokugan 2011-127618 mailed Dec. 18, 2013.

* cited by examiner

IMAGE FORMING APPARATUS FOR DETERMINING WHETHER IMAGES ARE NORMALLY FORMED IN A SET OF PAGES BASED ON A COMPARISON RESULT BETWEEN STORED PROCESSING RESULTS, AND IMAGE FORMING SYSTEM AND NON-TRANSITORY COMPUTER READABLE RECORDING MEDIUM

FIELD OF THE INVENTION

The present invention relates to an image forming apparatus capable of outputting a plurality of sets of output units, the output unit composed of a plurality of pages with a determined order being one set, an image forming system provided with the image forming apparatus and a computer readable recording medium storing control program for the image forming apparatus.

BACKGROUND OF THE INVENTION

Conventionally, there has been known an image forming apparatus which forms an image on a sheet based on image data and ejects the sheet having the image formed thereon. The image forming apparatus is, for example, a copier, a printer, a facsimile machine, a complex machine or the like. If the image forming apparatus is a copier, it obtains image data by reading an image from a document. On the other hand, if the image forming apparatus is a printer, it obtains image data from an external apparatus such as a personal computer.

A case where an image forming apparatus outputs an output unit composed of a plurality of pages is thought as the use of the image forming apparatus. In such a case, a confirmation operation of confirming whether or not images are normally formed on sheets is important. For example, in the confirmation operation, the presence or absence of page missing and page misplacement is confirmed.

Here, if page missing and page misplacement of an output are manually confirmed after the output in the case of outputting a plurality of sets of output units, particularly in production type printing for mass printing, a huge amount of man-hours are required. If outputs with page missing or page misplacement should be delivered to a client, this results in the considerable loss of the client's trust.

Accordingly, it is preferable to automate the confirmation operation and a technology for detecting page missing at the time of printing has been proposed in patent literature 1, patent literature 2 and the like.

In patent literature 1 is proposed an image forming apparatus in which identification information corresponding to each of a plurality of pages is attached to page data, arithmetic processings dependent on the reading order of the page data are performed, an arithmetic processing result of the nth set and those of the sets other than the nth set are compared to determine whether or not images have been normally formed on a plurality of sheets for the output units other than that of the $n^{th}$ set. Specifically, the absence of page missing, page misplacement and the like is determined if the arithmetic processing results of the sets other than the $n^{th}$ one agree with the arithmetic processing result of the $n^{th}$ set, and the presence of page missing, page misplacement or the like is determined unless the above arithmetic processing results agree.

In patent literature 2 is proposed a technology for comparing the total value of pixel numbers of a plurality of pages constituting the $n^{th}$ set of output unit and that of pixel numbers of a plurality of pages constituting the $(n+1)^{th}$ and subsequent sets of output units (hereinafter, referred to as a first technology). Specifically, an image forming apparatus determines the absence of page missing, page misplacement and the like in the $(n+1)^{th}$ and subsequent sets of output units if the total values of the pixel numbers agree. On the other hand, the image forming apparatus determines the presence of page missing, page misplacement or the like in the $(n+1)^{th}$ and subsequent sets of output units unless the total values of the pixel numbers agree.

CITATION LIST

Patent Literature

Patent Literature 1: Japanese Patent Application Laid-Open No. 2009-248319
Patent Literature 2: Japanese Patent Application Laid-Open No. 2009-189315

SUMMARY OF THE INVENTION

If the images differ from one set to another in printing a plurality of sets, for example, if images are output with variable images added thereto, abnormality cannot be determined even if the images themselves are compared for each set of output unit based on a coverage rate or an image checksum since the images themselves differ.

The variable images are stamp numbering, variable printing or the like.

Accordingly, even if identification information or the like is attached to image data, the agreement of the images of each set cannot be guaranteed and page missing and page misplacement cannot be reliably detected, wherefore confirmation has to be manually performed and there is a problem of very poor operation efficiency.

The present invention was developed in view of the above situation and at least one object thereof is to provide an image forming apparatus, an image forming system and a computer readable recording medium storing control program for the image forming apparatus capable of detecting the agreement of images of each set also in outputting images different from one set to another by including variable images or the like.

To achieve at least one of the above mentioned object, an image forming apparatus reflecting a first aspect of the present invention for outputting a plurality of sets of output units, the output unit composed of a plurality of pages with a determined order being one set, comprises an image forming unit for successively forming images corresponding to the respective plurality of pages on a plurality of sheets; a control unit for performing an arithmetic processing of an image eigenvalue calculated with a part of the image excluded for each output unit; a first storage for storing a result of the arithmetic processing performed for one specific set of output unit out of the plurality of sets of output units; and a second storage for storing the result of the arithmetic processing performed for the nth set of output unit out of the plurality of sets of output units; wherein the control unit determines whether or not the images are normally formed on the plurality of sheets for the nth set of output unit based on a comparison result between the result of the arithmetic processing stored in the first storage and that of the arithmetic processing stored in the second storage.

The image forming apparatus according to a second aspect of the present invention preferably further comprises an eigenvalue calculation unit for calculating the image eigenvalue of each of the images with a part of the image excluded at the time of or before the image formation in the first aspect of the present invention.

In the image forming apparatus according to a third aspect of the present invention, the control unit preferably performs the arithmetic processing in dependence on the order of the image eigenvalues in the first aspect of the present invention.

The image forming apparatus according to a fourth aspect of the present invention preferably further comprises an image data storage for storing image data corresponding to each of the plurality of pages and the control unit preferably controls the reading and writing of data of the images in and from the image data storage and repeatedly reads the image data from the image data storage a designated number of times in outputting the plurality of sets in the first aspect of the present invention.

In the image forming apparatus according to a fifth aspect of the present invention, the control unit can perform the arithmetic processing set by set, compares the result of the arithmetic processing stored in the first storage and that of the arithmetic processing stored in the second storage set by set after the output of the nth set of output unit is finished, and determines whether or not the images are normally formed on the sheets for the nth set of output unit in the first aspect of the present invention.

In the image forming apparatus according to a sixth aspect of the present invention, the control unit can perform the arithmetic processing page by page, compares the result of the arithmetic processing stored in the first storage and that of the arithmetic processing stored in the second storage after the output of a specified page of the nth set is finished, and determines whether or not the image is normally formed on the sheet for the specified page of the $n^{th}$ set in the first aspect of the present invention.

In the image forming apparatus according to a seventh aspect of the present invention, a part of the image to be excluded can be a variable image added to an original image in the first aspect of the present invention.

In the image forming apparatus according to an eighth aspect of the present invention, the arithmetic processing result stored in the first storage can be the result of the arithmetic processing performed for the first set of output unit at the time of the image formation, and the arithmetic processing result stored in the second storage can be the result of the arithmetic processing for a second or later set of output unit at the time of the image formation in the first aspect of the present invention.

In the image forming apparatus according to a ninth aspect of the present invention, the arithmetic processing result stored in the first storage and that stored in the second storage can be the results of the arithmetic processings performed for the output units between two successive sets in the first aspect of the present invention.

In the image forming apparatus according to a tenth aspect of the present invention, the arithmetic processing result stored in the first storage is preferably an image reference eigenvalue stored in advance before the image formation and the arithmetic processing result stored in the second storage is preferably the result of the arithmetic processing for each output unit from the first set of output unit at the time of the image formation in the first aspect of the present invention.

The image forming apparatus according to an eleventh aspect of the present invention further can comprise a printer controller for receiving data for images from the outside and processing them into image data for printing, and the eigenvalue calculation unit preferably determines a part of the image to be excluded based on image additional information of each page notified from the printer controller in the second aspect of the present invention.

The image forming apparatus according to a twelfth aspect of the present invention preferably further comprises an operation unit for receiving an operation input, and the operation unit is preferably capable of designating a part of the image to be excluded in the first aspect of the present invention.

In the image forming apparatus according to a thirteenth aspect of the present invention, a part of the image to be excluded is preferably determined by designating a coordinate position on the plane of the image before exclusion or any of divided images obtained by dividing the image to plural before exclusion in the first aspect of the present invention.

In the image forming apparatus according to a fourteenth aspect of the present invention, the control unit preferably performs an abnormality processing when the image is determined not to be normally formed in the first aspect of the present invention.

To achieve at least one of the abovementioned object, an image forming system reflecting a fifteenth aspect of the present invention comprises an image forming apparatus for outputting a plurality of sets of output units, the output unit composed of a plurality of pages with a determined order being one set, the image forming apparatus including an image forming unit for successively forming images corresponding to the respective plurality of pages on a plurality of sheets; an external apparatus capable of transmitting an image corresponding to each of a plurality of pages with a determined order; a network to which the image forming apparatus and the external apparatus are connected; and an eigenvalue calculation unit for calculating an image eigenvalue with a part of the image excluded for each of the images; wherein the image forming apparatus includes a control unit for performing an arithmetic processing of the image eigenvalue for each output unit, a first storage for storing the result of the arithmetic processing performed for one specific set of output unit out of the plurality of sets of output units, and a second storage for storing the result of the arithmetic processing performed for the nth set of output unit out of the plurality of sets of output units; and the control unit determines whether or not the images are normally formed on the plurality of sheets for the nth set of output unit based on a comparison result between the result of the arithmetic processing stored in the first storage and that of the arithmetic processing stored in the second storage.

In the image forming system according to a sixteenth aspect of the present invention, the eigenvalue calculation unit is preferably provided in the external apparatus or the image forming apparatus in the fifteenth aspect of the present invention.

In the image forming system according to a seventeenth aspect of the present invention, the external apparatus is preferably capable of transmitting the image added with a variable image and transmitting attribute information of the page together with the image in the fifteenth aspect of the present invention.

In the image forming system according to an eighteenth aspect of the present invention, the image additional information of each page preferably includes information on the part of the image to be excluded or information on the image eigenvalue in the seventeenth aspect of the present invention.

In the image forming system according to a nineteenth aspect of the present invention, an operation unit capable of designating the part of image to be excluded upon receiving an operation input is preferably provided in the external apparatus or the image forming apparatus in any one of the fifteenth aspect of the present invention.

To achieve at least one of the abovementioned object, an computer readable recording medium storing control program for the image forming apparatus reflecting a twentieth aspect of the present invention to cause a computer for controlling an image forming apparatus to output a plurality of sets of output units, the output unit composed of a plurality of pages with a determined order being one set, wherein the control program realizes a function of successively forming images corresponding to the respective plurality of pages on a plurality of sheets; a function of performing an arithmetic processing of an image eigenvalue calculated with a part of the image excluded for each output unit; a function of storing the result of the arithmetic processing performed for one specific set of output unit out of the plurality of sets of output units in a first storage; a function of storing the result of the arithmetic processing performed for the nth set of output unit out of the plurality of sets of output units in a second storage; and a function of determining whether or not the images are normally formed on the plurality of sheets for the output units of the nth set based on a comparison result between the result of the arithmetic processing stored in the first storage and the result of the arithmetic processing stored in the second storage.

In the computer readable recording medium storing control program for the image forming apparatus according to a twenty-first aspect of the present invention, wherein the control program further realizes a function of calculating an image eigenvalue with a part of the image excluded for each of the images at the time of or before the image formation in the twentieth aspect of the present invention.

EMBODIMENT OF THE INVENTION

Hereinafter, one embodiment of the present invention is described.

Figure 1:
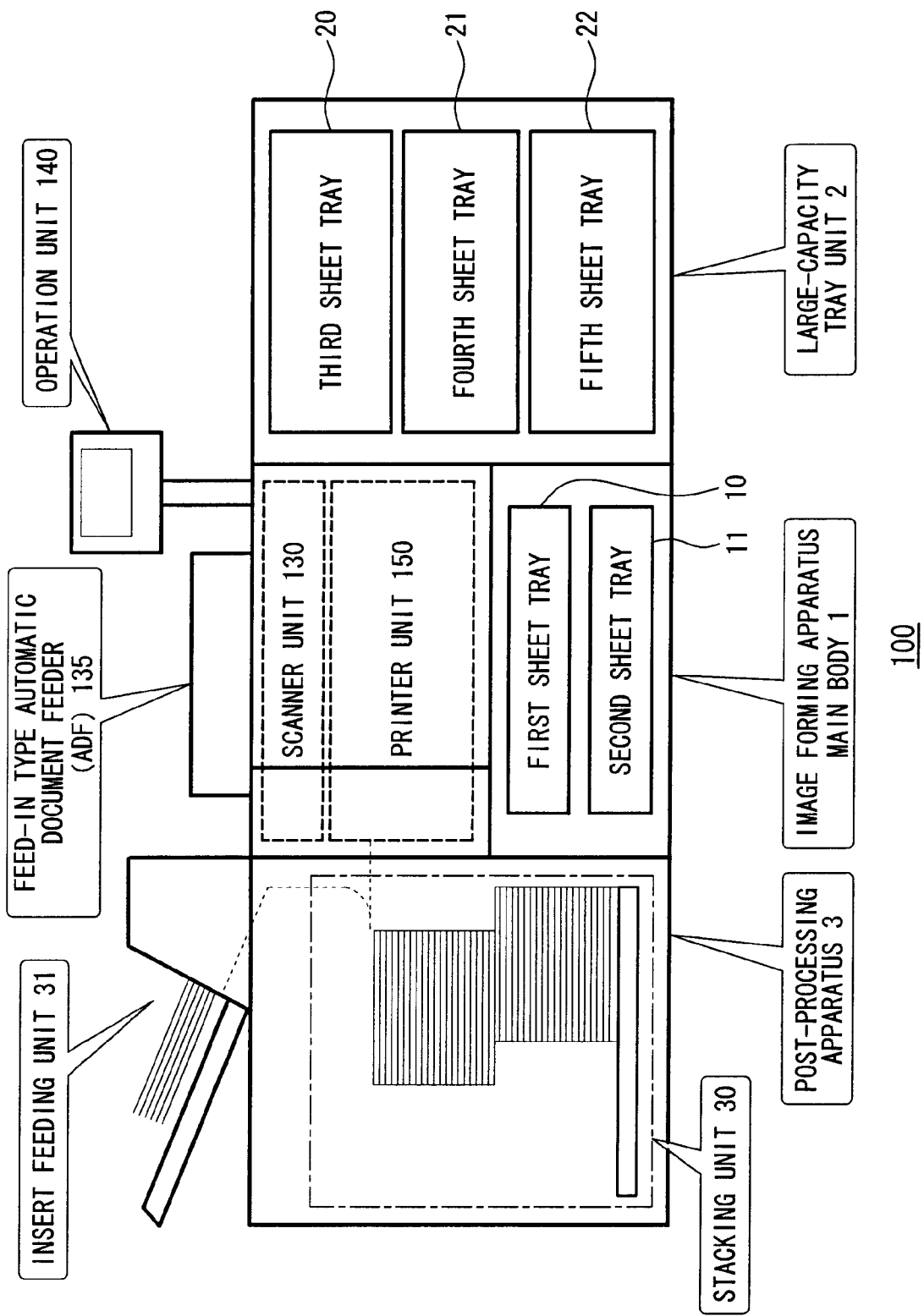
FIG. 1 is a schematic diagram showing an image forming apparatus according to one embodiment of the present invention.

As shown in FIG. 1, an image forming apparatus 100 includes an image forming apparatus main body 1, and a large-capacity tray unit 2 and a post-processing apparatus 3 attached to the image forming apparatus main body 1.

The large-capacity tray unit 2 includes a third sheet tray 20, a fourth sheet tray 21 and a fifth sheet tray 22 and sheets can be fed to the image forming apparatus main body 1 from each sheet tray.

The image forming apparatus main body 1 includes a first sheet tray 10 and a second sheet tray 11 in a lower part, thereby enabling the selective use of the tray together with the large-capacity tray unit 2.

A printer unit 150 for printing a sheet fed from each sheet tray and a scanner unit 130 for reading an image from a document are provided in the image forming apparatus main body 1, a feed-in type automatic document feeder (ADF) 135 for automatically feeding documents to the scanner unit 130 is further provided at upper portion of the image forming apparatus main body 1. Further, an operation unit 140 which can receive an operation input of an operator and display information is provided at upper portion of the image forming apparatus main body 1. The operation unit 140 can be configured by a touch panel or the like that is an integral assembly of an operation part and a display part. Alternatively, the operation part and the display part may be separately formed.

The post-processing apparatus 3 includes a stacking unit 30 for stacking sheets printed in the image forming apparatus main body 1 and output therefrom and an insert feeding unit 31 for feeding inserts to be inserted between printed sheets.

Figure 2:
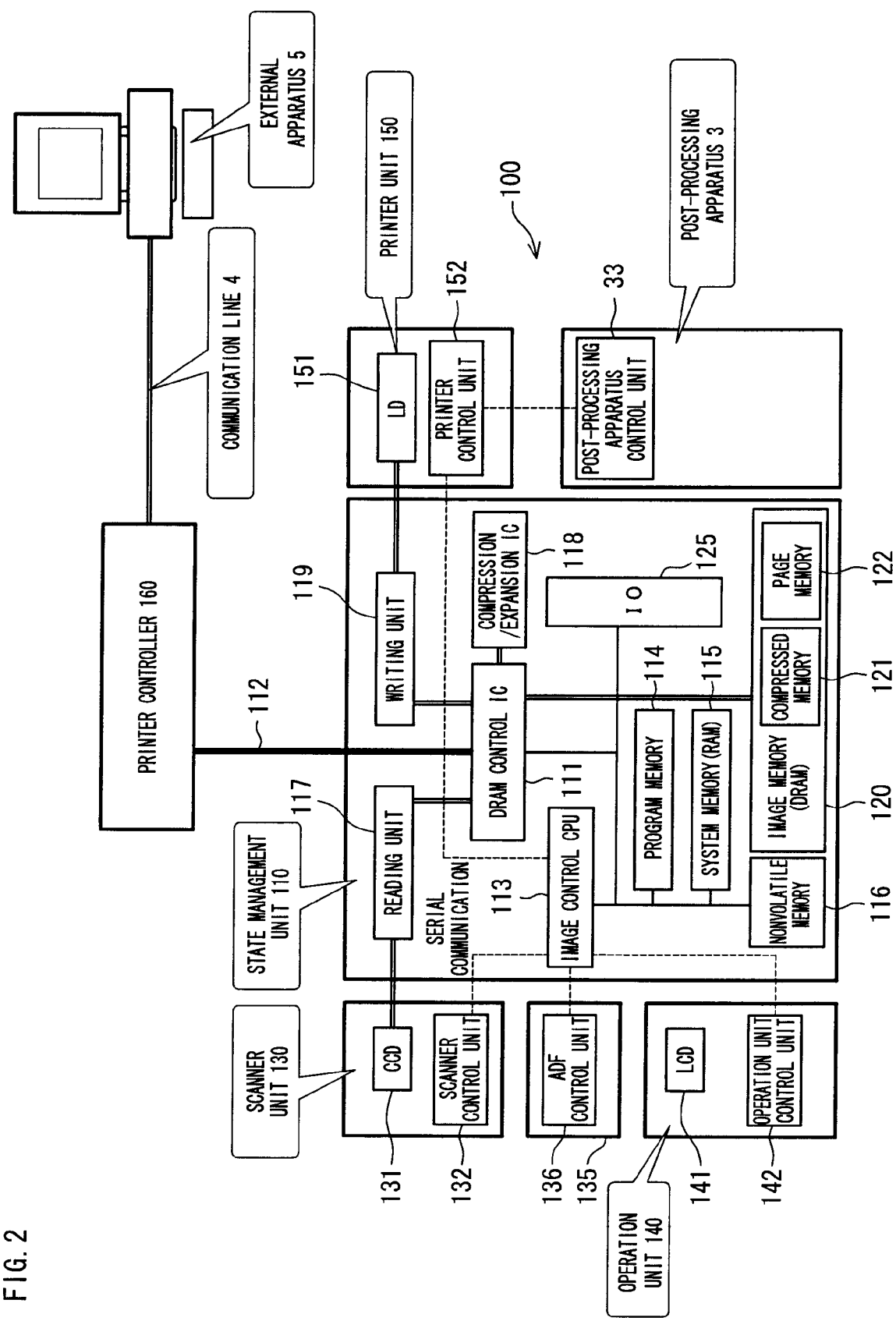
FIG. 2 is a diagram showing a control block.

Next, functions of the image forming apparatus 100 are described based on a control block diagram of FIG. 2.

The image forming apparatus 100 includes a state management unit 110, the scanner unit 130, the operation unit 140 and the printer unit 150 and also includes a printer controller 160 for processing image data input from an external apparatus 5 such as a PC via a communication line 4 such as a LAN or converting image data obtained in the scanner unit 130 to be transferable to the external apparatus 5 via the communication line 4.

The external apparatus 5 is configured by a personal computer, a server or the like equipped with printer driver and application software.

The above image forming apparatus 100, communication line 4 and external apparatus 5 configure an image forming system of the present invention.

The state management unit 110 includes a PCI bus 112 connected to the printer controller 160, and a DRAM control IC 111 is connected to the PCI bus 112. An image memory 120 is connected to the DRAM control IC 111. The image memory 120 includes a compressed memory 121 and a page memory 122. The compressed memory 121 is a memory for storing compressed image data, and the page memory 122 is a memory for temporarily storing non-compressed image data to be printed before image formation. The image memory 120 corresponds to an image data storage unit of the present invention.

Image data obtained by the above printer controller 160 are transmitted to the DRAM control IC 111 via the PCI bus 112 as a printing operation is performed.

The state management unit 110 also includes an image control CPU 113, and the DRAM control IC 111 is connected to the image control CPU 113.

Further, a program memory 114 configured by a nonvolatile memory such as a ROM for storing a program, a system memory 115 configured by a RAM for temporarily storing a work area and data, and a nonvolatile memory 116 configured by a flash memory or the like are connected to the image control CPU 113. Initial print setting information of the image forming apparatus 1, machine setting information such as process control parameters and calculation formulas for calculating image eigenvalues are stored in the nonvolatile memory 116 in a readable manner. The program can be provided by other computer readable recording medium.

The image control CPU 113 is capable of reading data of the program memory 114, the system memory 115 and the nonvolatile memory 116 and also capable of writing desired data in the system memory 115 and the nonvolatile memory 116.

The image control CPU 113 controls the operation of each part of the image forming apparatus 100 in accordance with the above machine setting information and the print setting information. Thus, the image control CPU 113 corresponds to a computer for controlling the image forming apparatus 100.

The scanner unit 130 includes a CCD 131 for optical reading and a scanner control unit 132 for controlling the entire scanner unit 130. The scanner control unit 132 is connected to be able to conduct serial communication with the image control CPU 113. Further, the CCD 131 is connected to a reading unit 117 for processing image data read by the CCD 131, and the reading unit 117 is controllably connected to the DRAM control IC 111 described above.

The operation unit 140 also serves as a display unit and includes an LCD 141 configured by a touch panel and an operation unit control unit 142 for controlling the entire operation unit. The operation unit control unit 142 is connected to be able to conduct serial communication with the image control CPU 113. In the operation unit 140, a part of image to be excluded for the calculation of an image eigenvalue can be designated by the LCD 141 under the control of the image control CPU 113.

Further, a compression/expansion IC 118 for compressing image data and expanding compressed image data is connected to the DRAM control IC 111. Furthermore, a writing unit 119 is connected to the DRAM control IC 111.

The writing unit 119 is connected to the printer unit 150 and processes write data used for the operation of an LD unit 151. The printer unit 150 includes an image forming unit and a sheet conveying mechanism configured by the LD unit 151 and the like. The image forming unit includes unillustrated photoconductor, transfer unit, fixing unit and the like besides that.

The printer unit 150 includes a printer control unit 152 for controlling the entire printer unit 150 (sheet feed, image formation, eject, post-processing, etc.), and the printer control unit 152 is connected to the image control CPU 113. The printer control unit 152 operates in accordance with a control command of the image control CPU 113 to control the printer unit 150. A post-processing apparatus control unit 33 for controlling the entire post-processing apparatus 3 is connected to the printer control unit 152, and the post-processing apparatus 3 is controlled via the printer control unit 152. In the post-processing apparatus 3, desired post-processing such as stapling or punching is performed on sheets ejected from the image forming apparatus main body 1.

The printer controller 160 is connected to the PCI bus 112 connected to the DRAM control IC 111. The printer controller 160 receives image data and the like from the external apparatus 5 connected to the communication line 4 or transmits image data obtained in the scanner unit 130 to the external apparatus 5 and the like connected to the communication line 4 in the case of using the image forming apparatus 100 as a network printer or a network scanner. In the printer controller 160, an image memory (not shown) configured by a DRAM or the like is connected to the DRAM control IC 111. Further, in the printer controller 160, a controller control IC, a communication line interface and the like are connected to a common bus. The communication line interface is connected to the communication line 4.

Further, an IO 125 is connected to the image control CPU 113. The IO 125 operates as an interface for transferring information among the respective parts in the image forming apparatus 100.

Next, a basic operation of the above image forming system is described.

First, the procedure of accumulating image data in the image forming apparatus 100 is described.

A case is described where image data is generated by reading an image by the scanner unit 130 in the image forming apparatus 100. In the scanner unit 130, an image is optically read from a document by the CCD 131. At this time, the operation of the CCD 131 is controlled by the scanner control unit 132 that receives a command from the image control CPU 113. The document may be read while being fed by the feed-in type automatic document feeder (ADF) 135 or while being placed on a platen glass.

The image control CPU 113 operates on a program and issues a command to the scanner unit 130 based on an operation by the operation unit 140. The image read by the CCD 131 is compressed by the compression/expansion IC 118 and stored in the compressed memory 121 via the DRAM control IC 111 after being subjected to data processing in the reading unit 117 and fed to the DRAM control IC 111.

Further, image data can be input to the image forming apparatus main body 1 from the external apparatus 5 via the communication line 4. The above image data include those generated by application software and the like of the external apparatus 5 and those generated by other image forming apparatuses. These data are received via the communication line 4 and the printer controller 160, and stored in the compressed memory 121 via the DRAM control IC 111 after being compressed by the compression/expansion IC 118 via the DRAM control IC 111.

The above image data include image additional information of each page, and the additional information includes information on the position of an added image when the added image is added to the image.

In the case of an output in the image forming apparatus 100, the data stored in the compressed memory 121 are sent to the compression/expansion IC 118 via the DRAM control IC 111 to be expanded, sent to the writing unit 119 to generate write data, and written in the LD unit 151. At this time, in the image control CPU 113, a control is executed to repeatedly read the image data from the compressed memory 121 for a designated number of sets in outputting a plurality of sets.

In the printer unit 150, the respective parts are controlled by the printer control unit 152 having received a command from the image control CPU 113 to feed sheets from the respective sheet trays and convey the sheets in the conveying mechanism. In the printer unit 150, images are formed, transferred to sheets and fixed to the sheets and the sheets are ejected to the post-processing apparatus 3. In the post-processing apparatus 3, a control is executed by the post-processing apparatus control unit 33 that receives a command from the printer control unit 152 to perform post-processing corresponding to the content of the command and the sheets are ejected. If there is no command for post-processing, the sheets are ejected without being subjected to any post-processing.

In the image forming system, an image eigenvalue can be calculated for the entire image or the image having a part thereof excluded for each image at the time of or before image formation. This calculation can be made by the writing unit 119 of the image forming apparatus 100. In this case, the writing unit 119 constitutes a part of the computer for controlling the image forming apparatus 100. This calculation can also be made by the external apparatus 5 if calculation by application software is possible.

Methods for obtaining the arithmetic processing result in advance include a method for obtaining them at the time of confirmation printing. In confirmation printing, one set is normally output for confirming the format and the like and confirmed by a user. Thus, by utilizing the arithmetic processing at the time of confirmation printing, whether or not the images are normally formed can be determined from the first set by the subsequent main output.

In another method for obtaining the arithmetic processing result in advance, calculation is performed when a document image is input by scanning or the like.

Further, a reference value can be obtained by an arithmetic processing using an eigenvalue generated by a printer driver or the like of an external apparatus and input while being added to image data.

In this embodiment, an image eigenvalue of a written image is calculated in the writing unit 119 at the time of image formation. At that time, the entire image or a part of the image is calculated based on calculation exclusion information (or calculation target information) of that image. The calculation exclusion information (or calculation target information) is designated by an image input source (printer controller 160) or set using the operation unit 140 or the like of the image forming apparatus 100. Accordingly, the writing unit 119 functions as an eigenvalue calculation unit of the present invention. The calculated image eigenvalues are successively stored in the system memory 115.

In this embodiment, the image data can be successively subjected to a CRC 32 code arithmetic processing. This processing is performed by the image control CPU 113. The CRC 32 code arithmetic processing corresponds to an arithmetic processing of the present invention. Thus, the image control CPU 113 functions as a control unit of the present invention.

In the above CRC 32 code arithmetic processing, when a sheet having an image formed thereon is ejected, information included in image data relating to the sheet is subjected to the CRC 32 code arithmetic processing and the result is stored in the system memory 115. This is repeated until the last sheet of the set is ejected.

In performing the arithmetic processing, the image eigenvalue stored in the system memory 115 is read, the arithmetic processing is performed in the image control CPU 113 and the arithmetic processing result is stored in the system memory 115. In performing the arithmetic processing, an arithmetic expression or the like is stored in the nonvolatile memory 116 and this is read to perform the arithmetic processing.

The CRC 32 code calculation result obtained at the time of ejecting the last sheet of the first one of a plurality of sets can be stored as a reference value in the system memory 115 in distinction from the other arithmetic processing results. Thus, the system memory 115 storing the calculation data of the first set corresponds to a first storage.

For the second or later sets, similar to the first set, the calculated CRC 32 code calculation results are stored as comparison data in an area of the system memory 115 different from a storage area for the calculation data of the first set. In this case, the system memory 115 corresponds to a second storage for storing the arithmetic processing result of the $n^{th}$ set.

The image control CPU 113 reads the calculation data of the first set stored in the area of the system memory 115 corresponding to the first storage, reads the calculation data of the second or later set stored in the area of the system memory 115 corresponding to the second storage, and checks whether or not the output of the nth set is a normal output by comparing the CRC codes of the both calculation data.

According to this embodiment, whether or not the output images of the set are normal can be determined after the output of the set is finished in making the above set-by-set determination. The determination may be made immediately after or after a while after the output is finished.

That is, according to this embodiment, whether or not the images are normally formed can be determined in the second or later set by comparing the arithmetic processing results of the second or later set with the arithmetic processing result of the first set as a reference.

According to this embodiment, whether or not the image is normally formed can be determined page by page for each set, whereby misplaced pages as well as missing pages can be detected. Note that, in the embodiment, whether or not the image is normally formed may be determined set by set besides being determined page by page. Examples of such include determination by checksumming the entire set. In set-by-set detection such as checksumming, page misplacement cannot be detected, but page missing can be detected since the eigenvalue is same even if the page order changes. This embodiment is also included in the present invention.

In the image control CPU 113, an abnormality processing is performed if the comparison result indicates a disagreement. That is, if the calculation data are judged to disagree as a result of the comparison, commands are issued to the printer control unit 152 and the post-processing apparatus control unit 33 and sheets in the image forming apparatus are ejected to finish the image formation without starting the feed of a new sheet.

According to the embodiment, the abnormality processing is performed to notify an operator or stop the image forming apparatus when it is determined that the images are not normally formed. This enables quick removal or the like of abnormal images. In notifying an abnormality, a display indicating an abnormality occurrence position is made for the output sheets so that an output can be easily repaired.

According to the embodiment, even if different images are included in each set, whether or not the image formation is normally performed can be determined based on the arithmetic processing comparison of the image eigenvalues for the one specific set of output unit and the $n^{th}$ set of output unit.

The image eigenvalue can be calculated by various methods. For example, a CRC 32 code, a checksum, a coverage rate and other techniques for image data can be used and the method is not limited to the specific one according to the present invention.

The eigenvalue calculation unit for calculating the image eigenvalue with a part of the image excluded may be provided separately from the control unit or the control unit may serve as such. Further, without calculating the eigenvalues in the image forming apparatus, image eigenvalues calculated in an external apparatus connected to a network may be obtained and used for calculation.

As described above, according to the embodiment, page misplacement and page missing caused by missing pages and misplaced pages can be automatically detected by set-by-set image comparison also in outputting images different in each set by including variable images or the like. Thus, defective printed matters can be easily found also at the time of output in variable printing in which only addresses differ or in a stamp numbering mode in which a set number is printed on each set.

Figure 3:
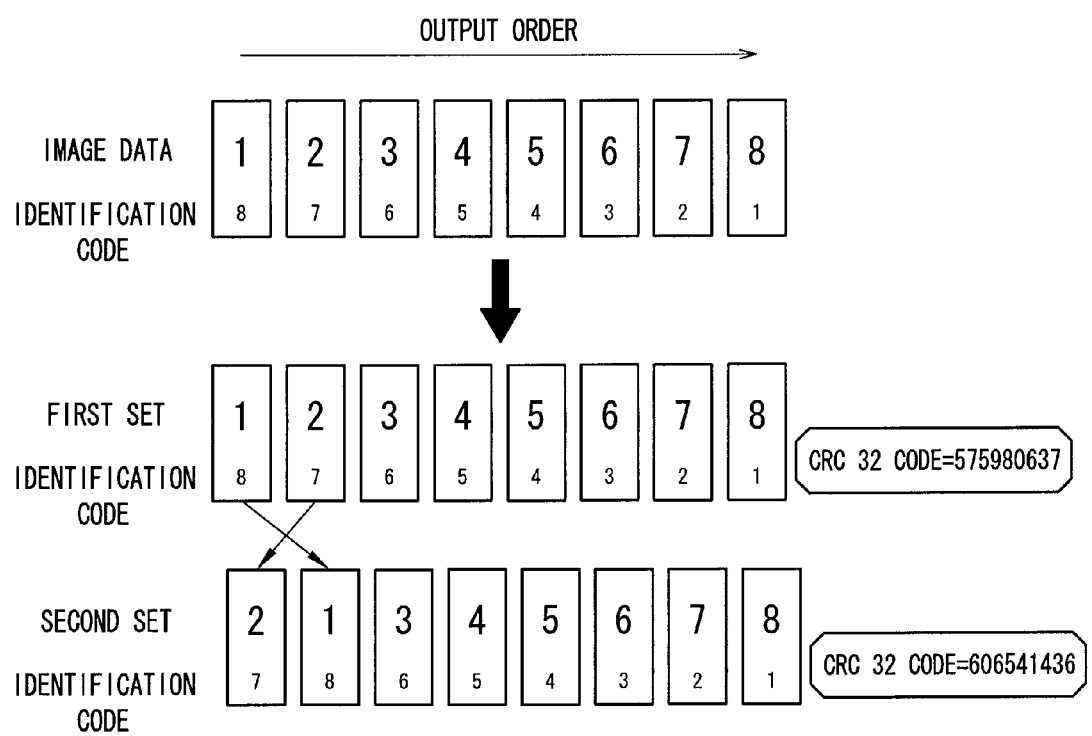
FIG. 3 is a diagram showing an example of a set-by-set CRC code arithmetic processing.

FIG. 3 shows an example of the CRC 32 code arithmetic processing by the set. Note that a CRC 32 code generates a 32-bit CRC (cyclic redundancy check) checksum of str and is normally used to verify the consistency of received data.

In FIG. 3, an identification code as an eigenvalue is calculated and the CRC 32 code is calculated using this value. Note that although the identification code of this example is 1 to 8 to make the 32-bit CRC 32 code easily understandable, it is not actually necessary that the identification code is made up of values arranged in an incremental manner in this way.

As shown in FIG. 3, if the order of pages is misaligned, the CRC 32 code calculation result indicates a different value, whereby a misalignment in the order of the pages can be known.

Figure 4:
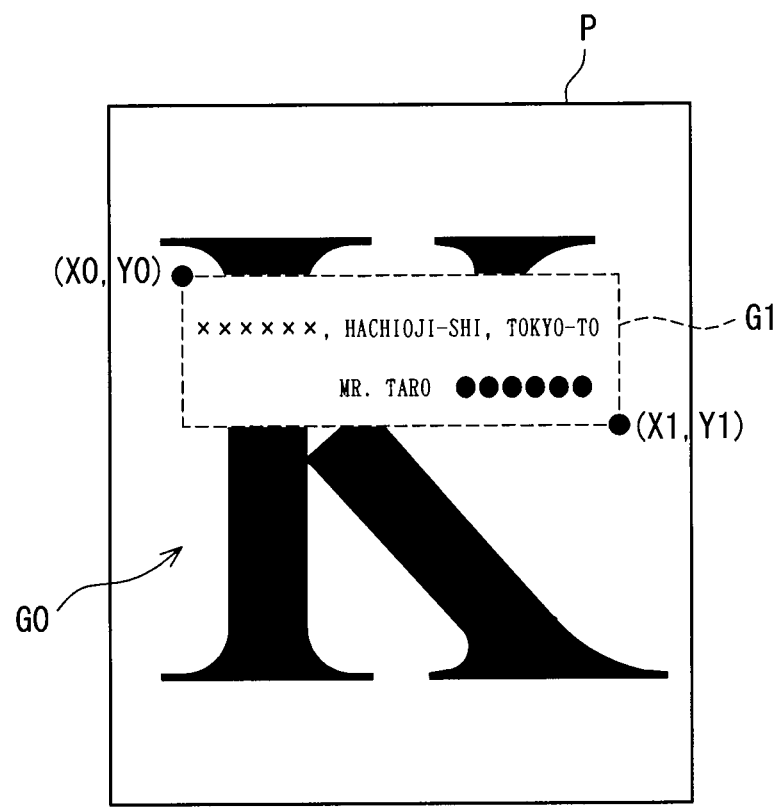
FIG. 4 is a diagram showing an example of a part of image exclusion.

FIG. 4 is a diagram showing a specific example of excluding a part of an image.

A representative example of the image to be excluded is an image which is added to an original image and possibly differs from one set to another. Examples include images by stamp numbering and variable printing for printing addresses, company names and the like. However, the image to be excluded is not limited to these according to the present invention, and any images which possibly differ from one set to another can be included.

In this form, an image checksum used as an identification code uses an XOR (exclusive OR) on an 8-pixel basis. An image G0 is formed on a sheet P as a calculation target and an image G1 in a range designated by coordinates as described below is excluded from the calculation target. The image G1 is an image added as variable printing.

In this example, image data is transmitted from the external apparatus 5, this image data is received by the image forming apparatus 100, and image additional information of each page is added to the image data. The image additional information of the page includes calculation exclusion information for exclusion from the calculation target. Examples of the calculation exclusion information are listed below.

The image additional information may be included in an attribute information of the page.

Calculation exclusion information type: With exclusion (previous screen image target), without exclusion are set.

Calculation exclusion information storage location: The calculation exclusion information is stored in a page header provided for each image as one of image information notified from an image input source.

Calculation exclusion information storage timing: When image data is stored (external apparatus).

Calculation exclusion information reference method: Referred at the time of calculating an image eigenvalue of a write image in the writing unit during image formation.

According to this embodiment, whether or not the image added with the variable image is normally formed can be determined for each set of output unit.

Figure 5:
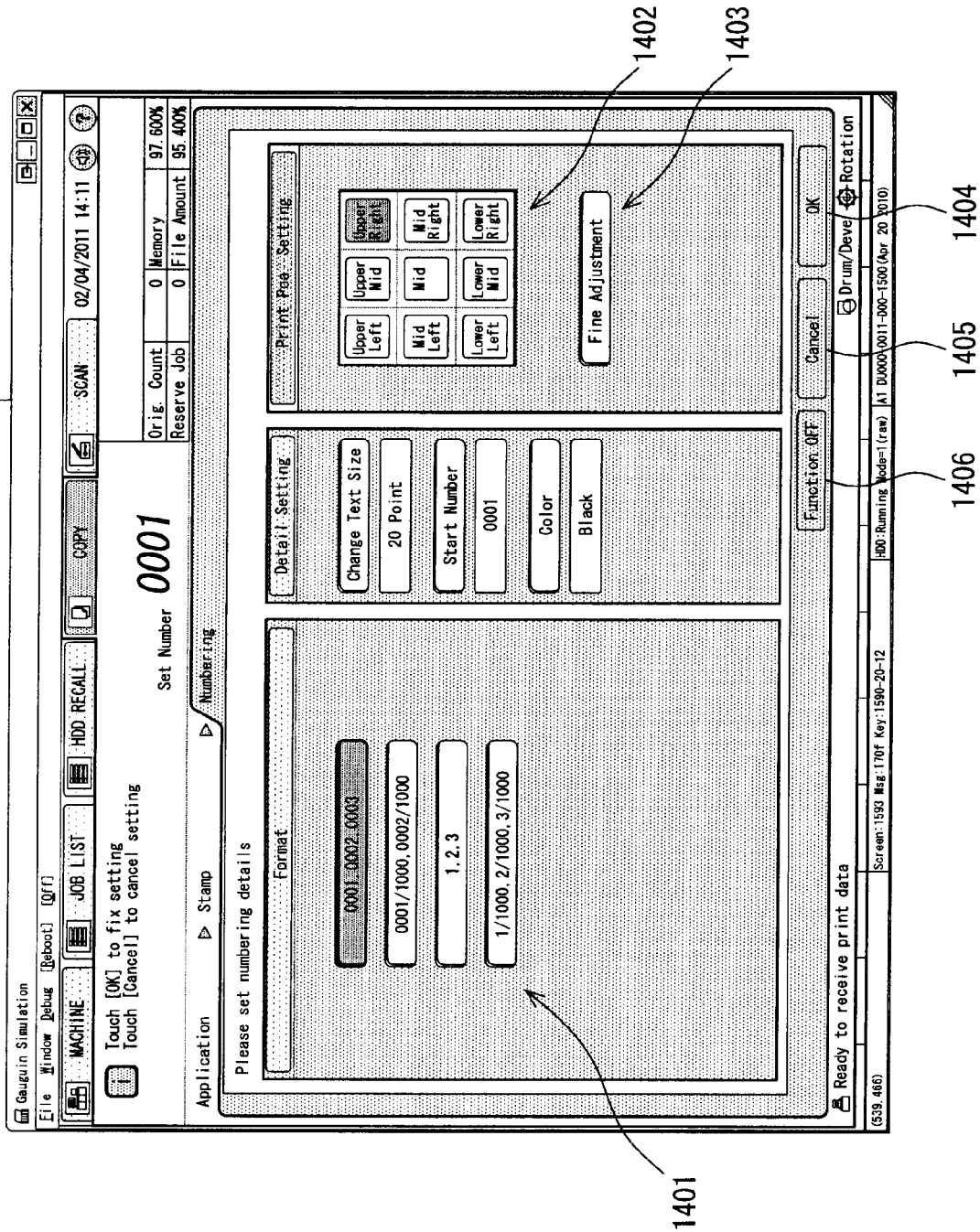
FIG. 5 is a view showing an example of a screen for setting set numbering.
Figure 6:
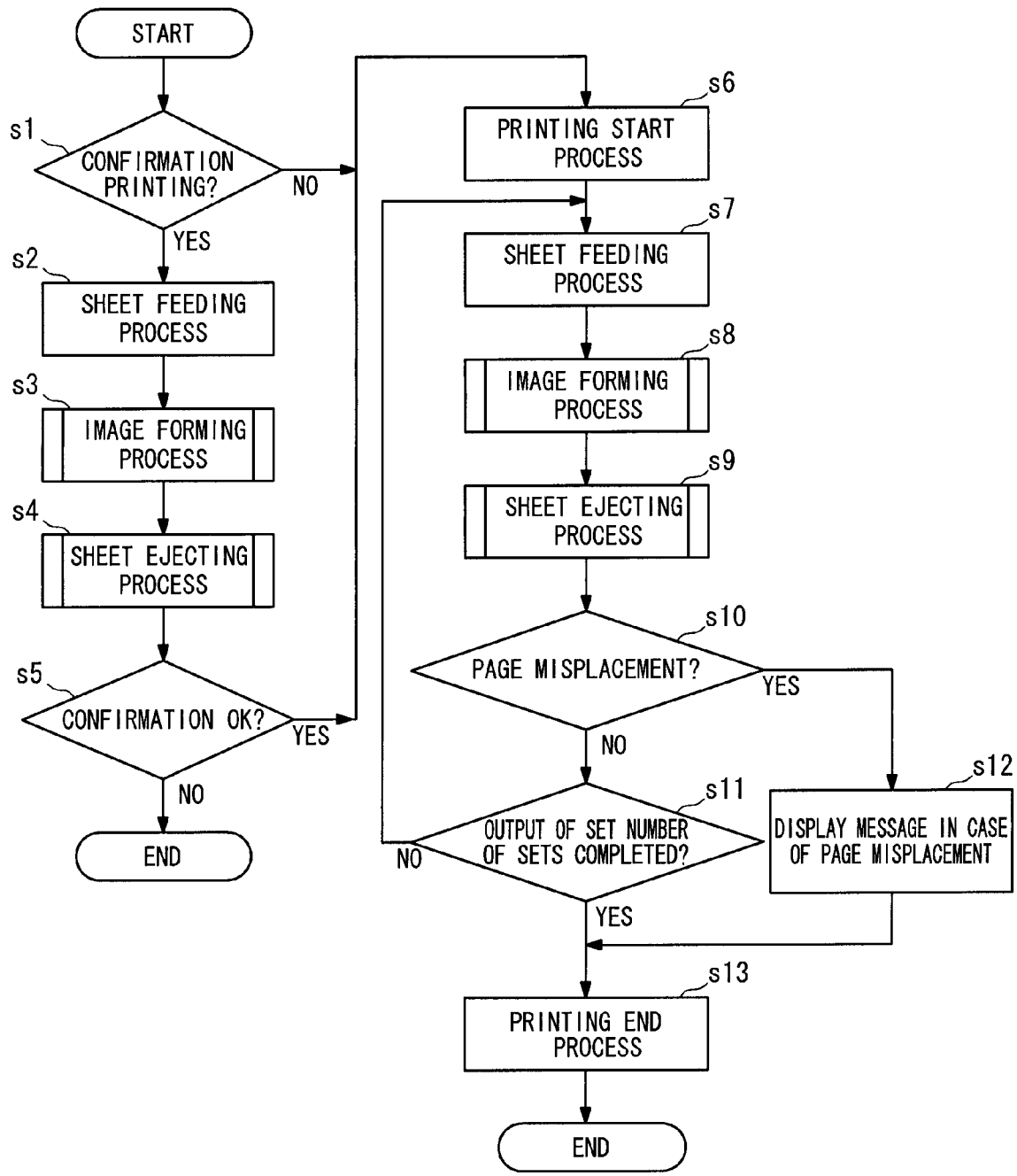
FIG. 6 is a flow chart showing the procedure of outputting a plurality of sets of output units.

FIG. 5 shows a setting screen when an image of set numbering is attached to an input image. A setting screen 1400 for set numbering can be displayed on the operation unit 140 or on an operation screen provided in the external apparatus 5.

On the setting screen 1400, a set of format buttons 1401 used to format the numbering are pressably displayed, and the numbering is performed by the selected format button. In this example, the numbering of "0001" - - - "000n" is performed according to the number of sets. Further, a set of print position setting buttons 1402 are provided on the setting screen 1400 and a print position (upper-middle-lower, left-middle-right) on a sheet can be set. By pressing a "Fine Adjustment" button 1403, the print position can be finely adjusted utilizing the set of print position setting buttons 1402.

If the print position is set and an OK button 1404 is pressed, the print position is determined as coordinates, the image data is stored in a memory or the like and necessary information is added to print exclusion information. That is, with exclusion is set and set coordinate information is attached to setting information. If a cancel button 1405 is pressed, the contents of setting are canceled. If a "Function OFF" button 1406 is pressed, a set number printing function is turned off. As a result, information on without exclusion is attached to the calculation exclusion information.

Next, the procedure of determining set by set whether images agree or disagree is described based on flow charts of FIGS. 6 to 9.

First, whether or not the execution of confirmation printing is selected is determined (Step s1). Unless the execution of the confirmation printing is selected (Step s1, NO), a transition is made to a printing start process (Step s6). If the execution of the confirmation printing is selected in Step s1 (Step s1, YES), a sheet feeding process is performed (Step s2) and subsequently an image forming process (Step s3) and a sheet ejecting process (Step s4) are successively performed.

In the image forming process, image eigenvalues are calculated. This is described in detail later.

In the sheet ejecting process, the CRC code arithmetic processing is performed for one set of confirmation-printed output unit if necessary and whether images agree or disagree are determined for the set after the last sheet of the set is ejected. Note that this is described in detail later.

After the sheet ejecting process (Step s9), whether or not there is any page misplacement is determined (Step s10). The page misplacement is determined based on whether or not a page misplaced state to be described later is set. If there is no page misplacement (Step s10, NO), whether or not the output of a set number of sets has been completed is determined (Step s11). Unless the output of the set number of sets has been completed (Step s11, NO), a return is made to the sheet feeding process of Step s7 to continue the output. On the other hand, if the output of the set number of sets has been completed (Step s11, YES), a printing end process is performed (Step s13). If there is any page misplacement in Step s10, a message in case of page misplacement is displayed on the operation unit 140 or the like (Step s12) and the printing end process is performed (Step s13).

By the above, if there is any page misplacement, the page misplacement can be easily dealt with by displaying the message and ending the printing.

Figure 7:
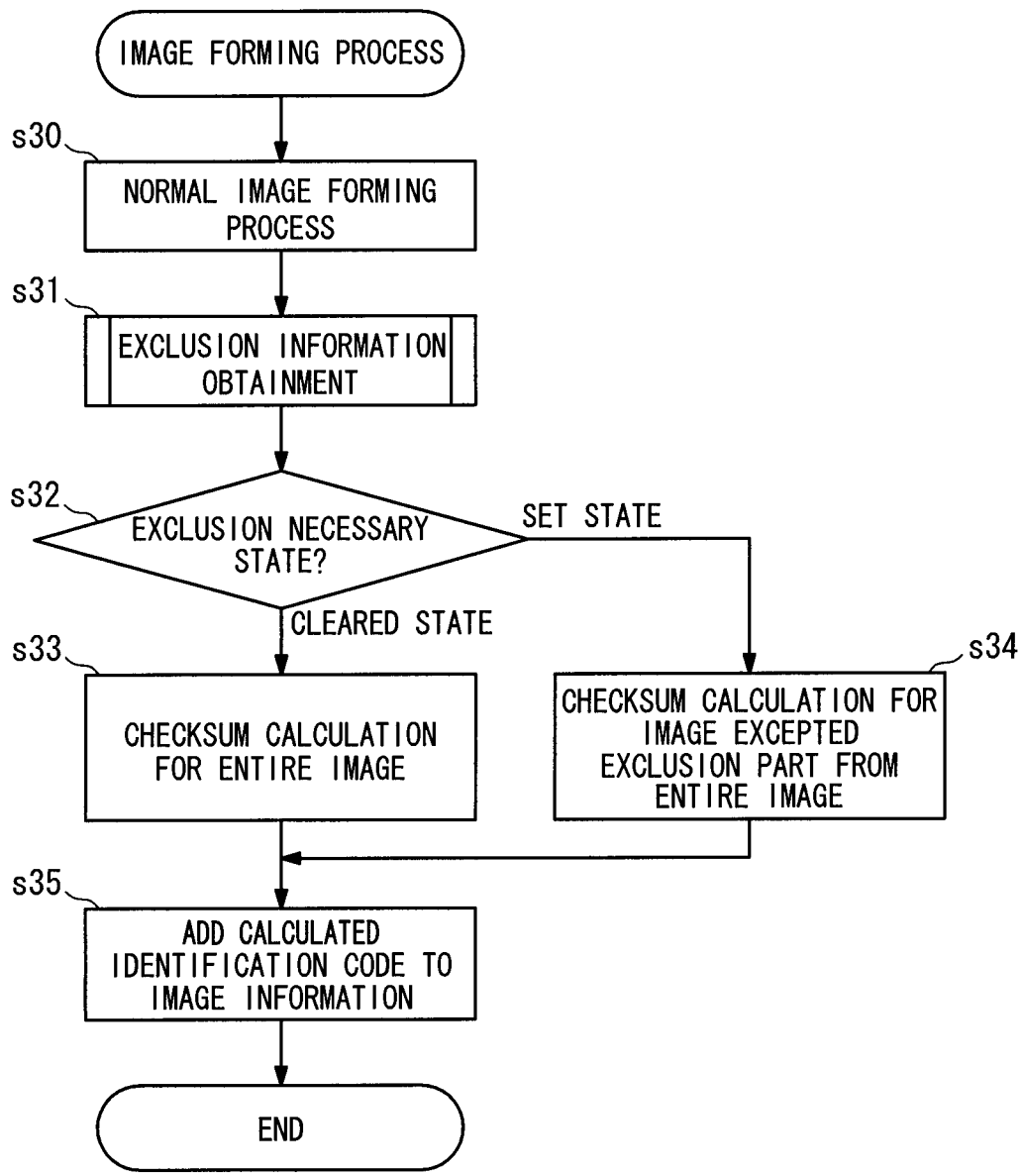
FIG. 7 is a flow chart showing the procedure of an image forming process.

Next, the above image forming process (Steps s3, s8) is described in detail based on a flow chart of FIG. 7.

First, a normal image forming process is performed (Step s30) and exclusion information added to the image data is obtained (Step s31). Whether or not exclusion is necessary is determined from the exclusion information (Step s32). If an exclusion necessary state is cleared (Step s32, NO), a checksum calculation is performed for the entire image (Step s33), a calculated identification code is added to image information (Step s35) and this process is finished. If it is determined that the exclusion is necessary in Step s32 (Step s32, YES), the exclusion necessary state is set and the checksum calculation is performed for the entire image except an image part necessary to be excluded (Step s34) and the calculated identification code is added to the image information (Step s35) and this process is finished.

Figure 8:
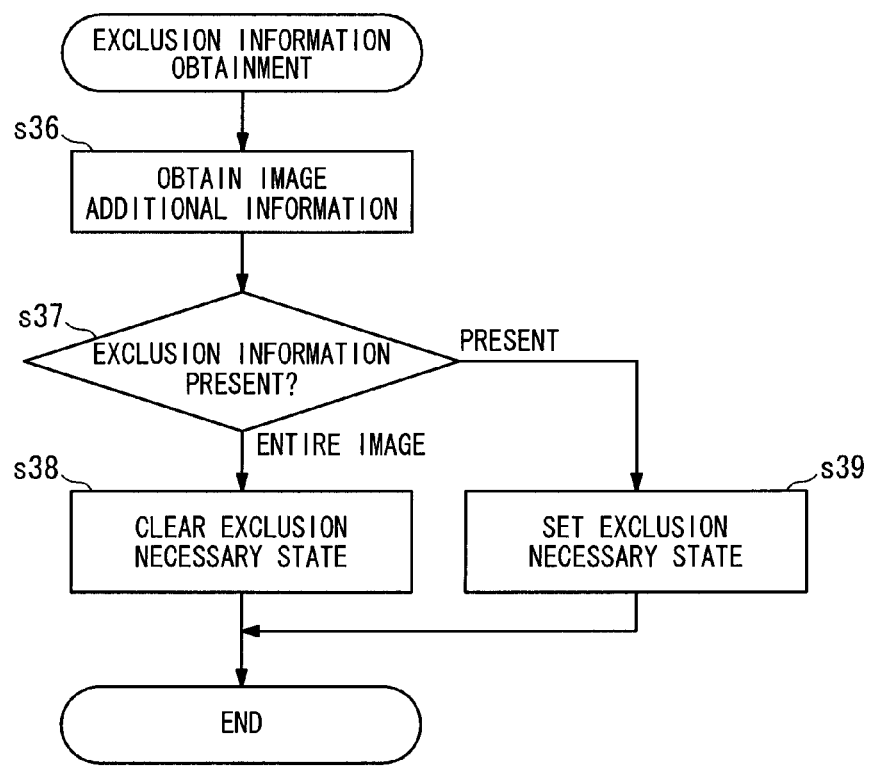
FIG. 8 is a flow chart showing the procedure of obtaining exclusion information.

The procedure of obtaining the exclusion information in the above procedure is described based on a flow chart of FIG. 8.

First, the image additional information is obtained from the image information (Step s36).

Exclusion information is attached to image additional information sent as header information of an image at time of inputting the image from the printer controller and at the time of receiving the image, in addition to information such as image size and resolution. In variable printing, coordinate information of an image area where an image different in each set such as an address is synthesized is attached. Further, in the case of attaching stamp numbering or the like in the image forming apparatus, coordinate information to be excluded is calculated based on stamp position information (see FIG. 5) designated on the operation unit of the image forming apparatus and the image size.

After the image additional information is obtained, whether or not the image additional information includes the exclusion information is determined (Step s37). If the presence of the exclusion information is determined (Step s37, present), the exclusion necessary state is set (Step s39), and this process is finished. If the absence of the exclusion information is determined (Step s37, entire image), the entire image becomes a target, the exclusion necessary state is cleared (Step s38), and this process is finished.

Figure 9:
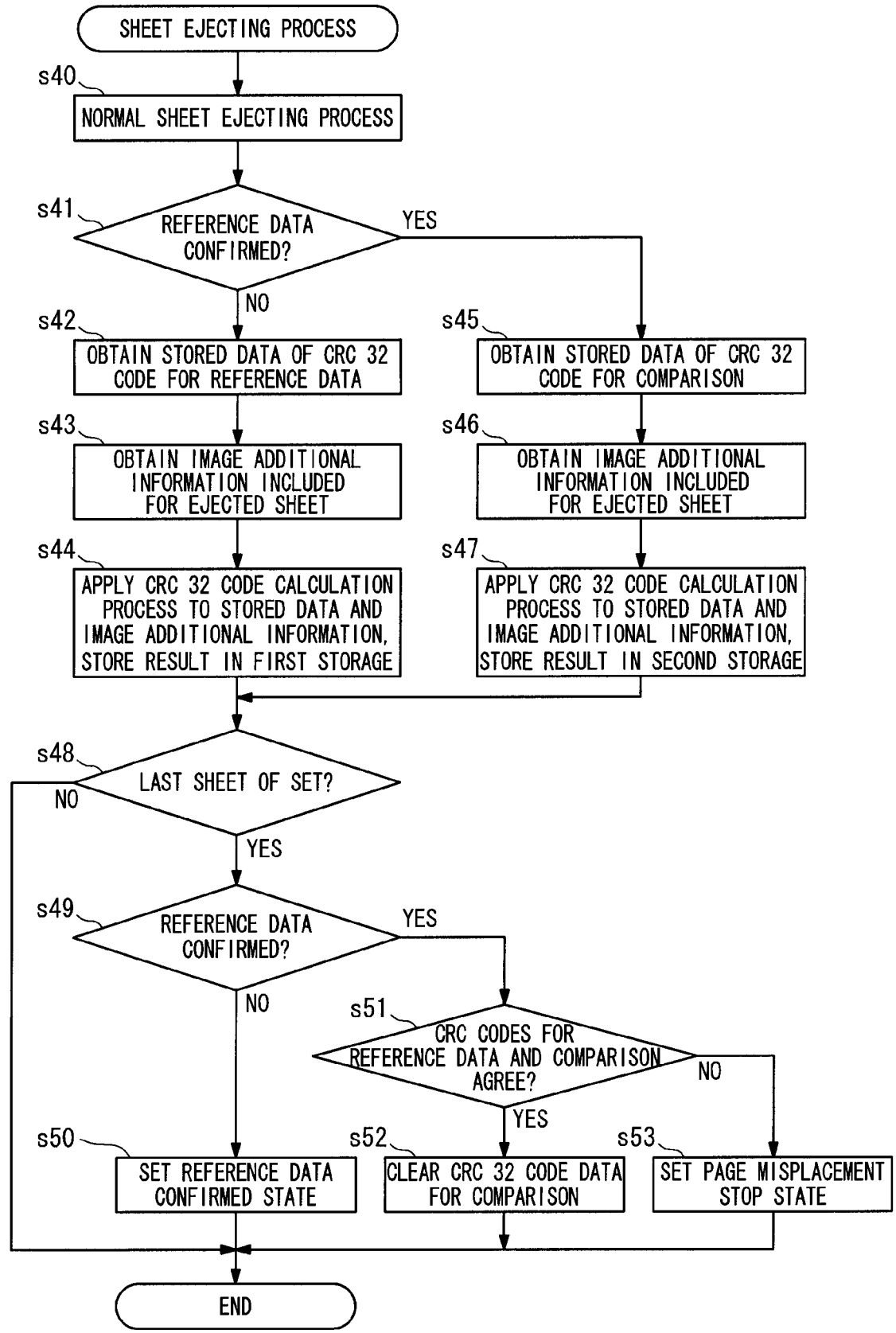
FIG. 9 is a flow chart showing the procedure of a sheet ejecting process.

Next, the sheet ejecting process (Steps s4, s9) is described in detail based on a flow chart of FIG. 9.

First, a normal sheet ejecting process is performed (Step s40) and whether or not reference data for image comparison is already confirmed is determined (Step s41).

Unless the reference data is already confirmed (Step s41, NO), a CRC 32 code for reference data is read and obtained from the system memory 115 where this code data is stored (Step s42). For the first page, the code data is not stored and, therefore, not read. Subsequently, the image additional information included for the ejected sheet is obtained (Step s43). The stored data obtained in Step s42 and the image additional information, here, the identification code calculated in the image forming process are subjected to the CRC 32 code arithmetic processing and the arithmetic processing result is stored in a predetermined area of the system memory 115 as the first storage (Step s44).

If the reference data is already confirmed in Step s41 (Step s41, YES), a data CRC 32 code for comparison is read and obtained from the system memory 115 where this code data is stored (Step s45). For the first page, the code data is not stored and, therefore, not read. Subsequently, the image additional information included for the ejected sheet is obtained (Step s46). The stored data obtained in Step s45 and the image additional information, here, the identification code calculated in the image forming process are subjected to the CRC 32 code arithmetic processing and the arithmetic processing result is stored in a predetermined area of the system memory 115 as the second storage (Step s47)

After the CRC code data for reference data or comparison is stored in the system memory 115 (Step s44, s47), whether or not the ejected sheet is the last sheet of the set is determined (Step s48). Unless the ejected sheet is the last sheet of the set (Step s48, NO), this process is finished.

If the ejected sheet is the last sheet of the set (Step s48, YES), whether or not the reference data is already confirmed is determined (Step s49). Unless the reference data is already confirmed (Step s49, NO), a reference data confirmed state is set (Step s50), and this process is finished. If the reference data is already confirmed (Step s49, YES), the CRC codes for reference data and comparison are read from the system memory 115 as the first storage and the second storage and whether or not the both codes agree is determined (Step s51). If the both CRC codes agree (Step s51, YES), the data of the CRC 32 code for comparison stored in the system memory 115 is cleared (Sep s52) and this process is finished, assuming that the images are normally output. Unless the CRC codes agree, a page misplacement stop state is set (Step s53) and this process is finished, assuming that the pages are misplaced.

Note that since the CRC is calculated set by set in this example, the page misplacement cannot be detected if the CRC codes accidentally agree even if the pages are misplaced. Further, in the case of performing a simple checksum set by set, the page misplacement cannot be detected although the page missing can be detected.

Figure 10:
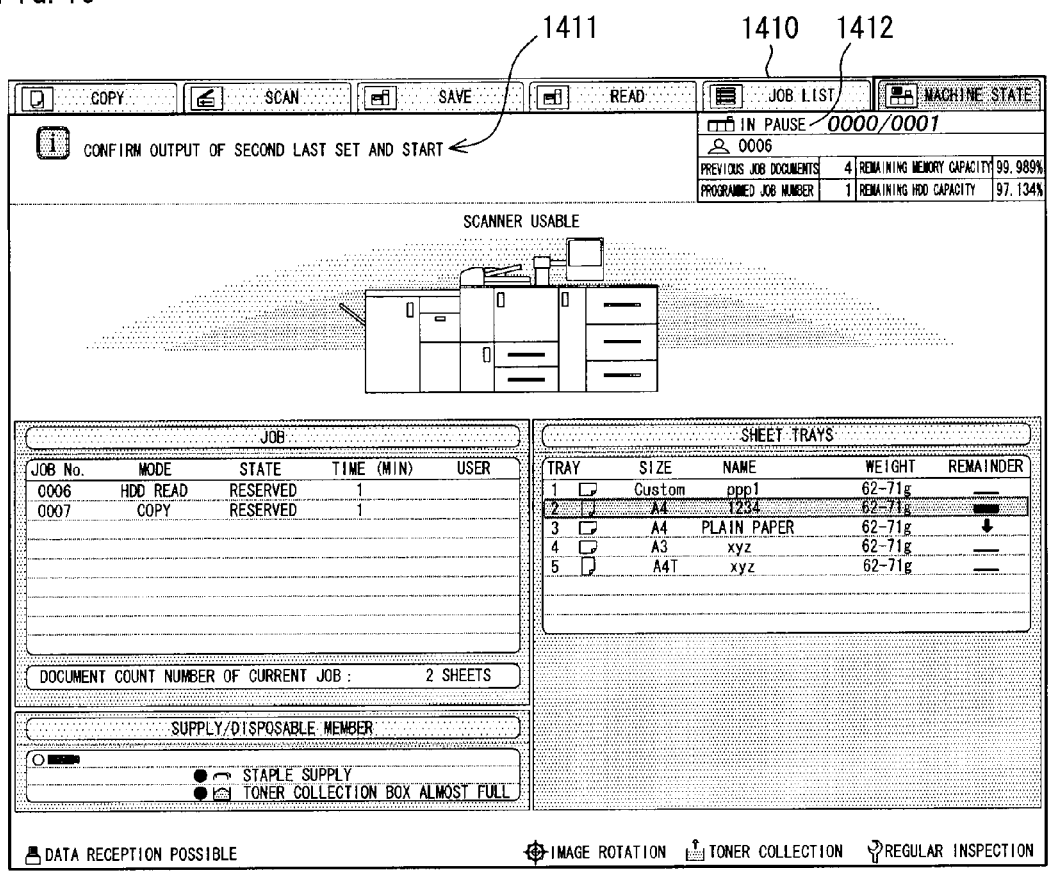
FIG. 10 is a view showing an example of a screen displaying page misplacement by the set.

FIG. 10 shows a display screen 1410 displaying a message when the above determination is performed set by set and the page misplacement is determined. The display screen 1410 can be displayed on the operation unit 140 or the like. The display screen 1410 includes a message field 1411 and a message directs attention to the confirmation of the output up to the second last set and starting. This is because of a possibility of ejecting a plurality of sets after an abnormality is detected such as when there are fewer pages per set, and a wide range is set as a target range for abnormal output. At this time, how many sets should be retrospectively confirmed may be calculated from an output speed, the number of pages per set in the control unit.

Further, on the display screen 1410, it is indicated in a state display field 1412 that the image forming apparatus is stopped.

Although the set-by-set determination has been described above, the determination of the present invention can be made page by page. This is described in detail below.

Figure 11:
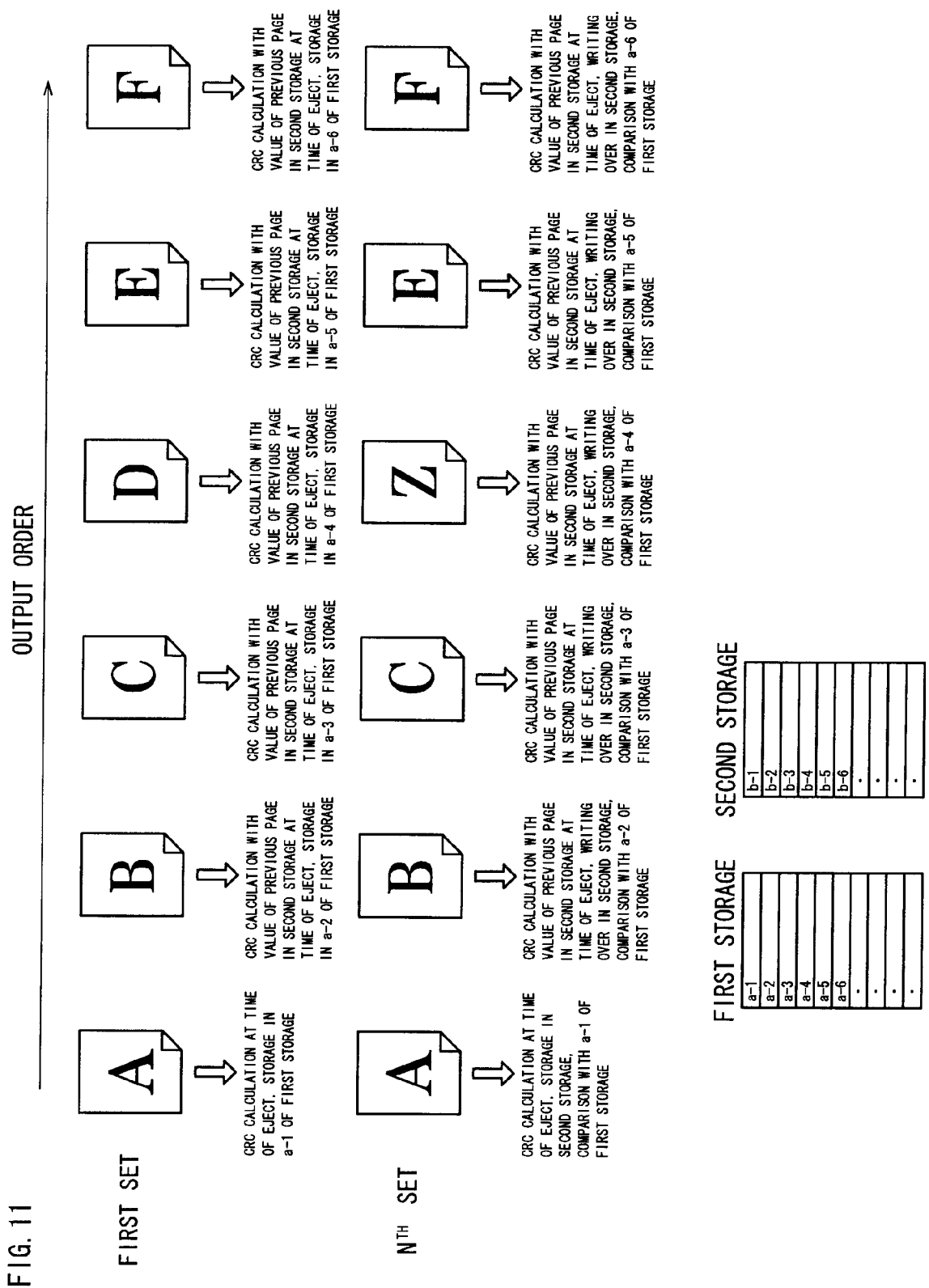
FIG. 11 is a diagram showing an example of a page-by-page CRC arithmetic processing.
Figure 12:
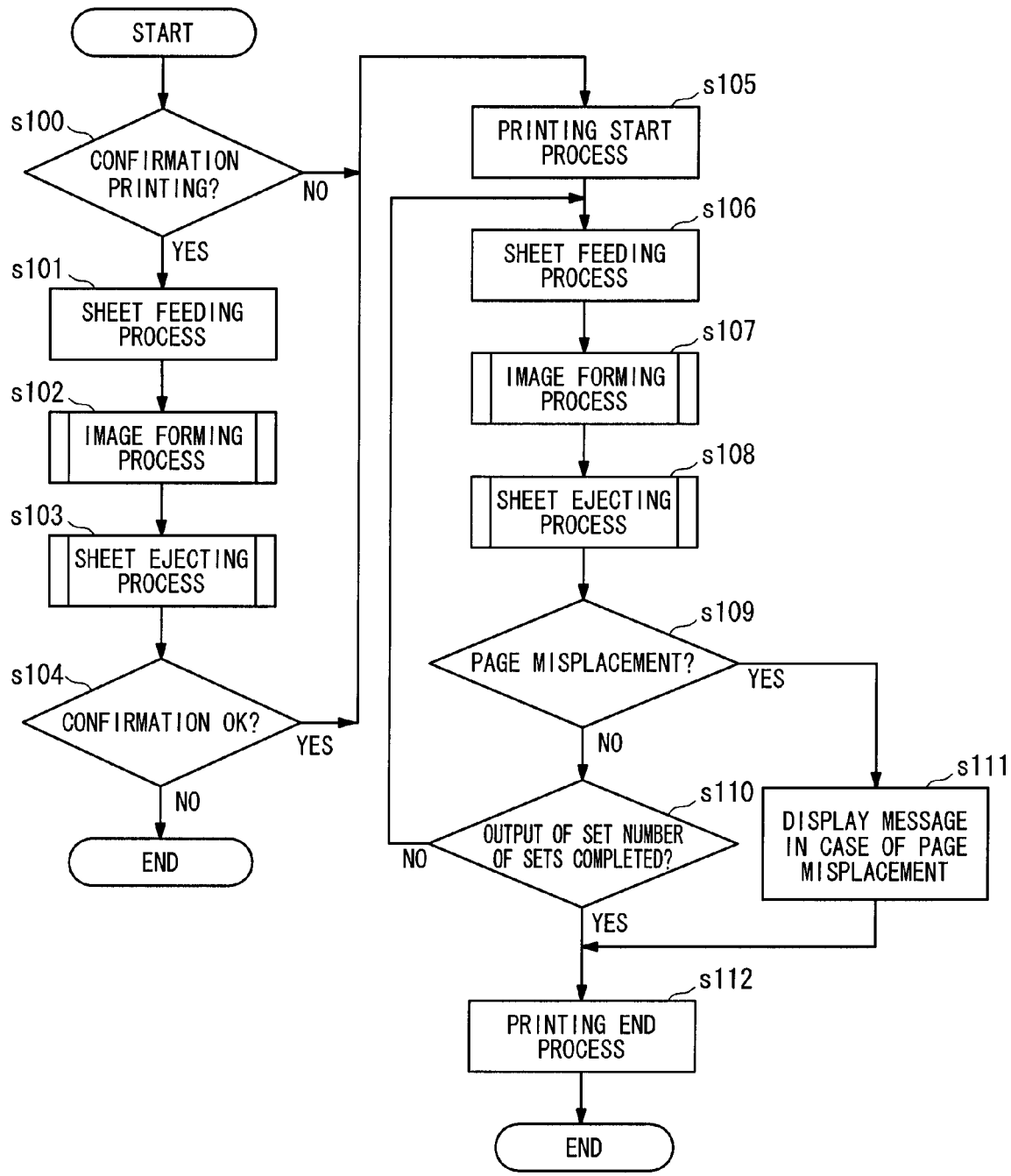
FIG. 12 is a flow chart showing the process of outputting a plurality of sets of output units.

FIG. 11 shows an example of a CRC 32 code arithmetic processing when an arithmetic processing is performed page by page and the detection is made page by page. In the calculation of the CRC code, the CRC arithmetic processing is performed every time a page of each set is ejected and the arithmetic processing result is stored per page. In this example, a CRC code for reference data is calculated in the first set and stored per page in the first storage. In the nth set, a CRC code for comparison is calculated and stored per page in the second storage. At that time, the data in the first storage and the data in the second storage are compared per page. When the set is changed, the CRC code calculation result is written over in the second storage.

Next, the procedure of determining page by page whether images agree or disagree is described with reference to flow charts of FIGS. 12 to 15.

First, whether or not the execution of confirmation printing is selected is determined (Step s100). Unless the execution of the confirmation printing is selected (Step s100, NO), a transition is made to the printing start process (Step s105). If the execution of the confirmation printing is selected in Step s100 (Step s100, YES), the sheet feeding process is performed (Step s101) and subsequently the image forming process (Step s102) and the sheet ejecting process (Step s103) are successively performed.

In the image forming process, image eigenvalues are calculated. This is described in detail later.

In the sheet ejecting process, the CRC code arithmetic processing is performed page by page for one set of confirmation-printed output unit if necessary and whether images agree or disagree is determined page by page. Note that this is described in detail later.

After the sheet ejecting process, whether or not the result of the confirmation printing is OK is determined (Step s104). The operator is requested to input on the operation unit or the like as to whether or not the result of the confirmation printing is OK.

Unless the confirmation is OK (Step s104, NO), this process is finished. If the confirmation is OK (Step s104, YES), a transition is made to the printing start process (Step s105). Following the printing start process, the sheet feeding process (Step s106), the image forming process (Step s107) and the sheet ejecting process (Step s108) are successively performed. The image forming process and the sheet ejecting process are similar to those described above and described in detail later.

After the sheet ejecting process, whether or not there is any page misplacement is determined (Step s109). If there is no page misplacement (Step s109, NO), whether or not the output of a set number of sets has been completed is determined (Step s110). Unless the output of the set number of sets has been completed (Step s110, NO), a return is made to the sheet feeding process of Step s106 to continue the output. On the other hand, if the output of the set number of sets has been completed (Step s110, YES), the printing end process is performed (Step s112). If there is any page misplacement in Step s109, a message in case of page misplacement is displayed on the operation unit or the like (Step s111) and the printing end process is performed (Step s112).

By the above, if there is any page misplacement, the page misplacement can be easily dealt with by displaying the message and ending the printing.

Figure 13:
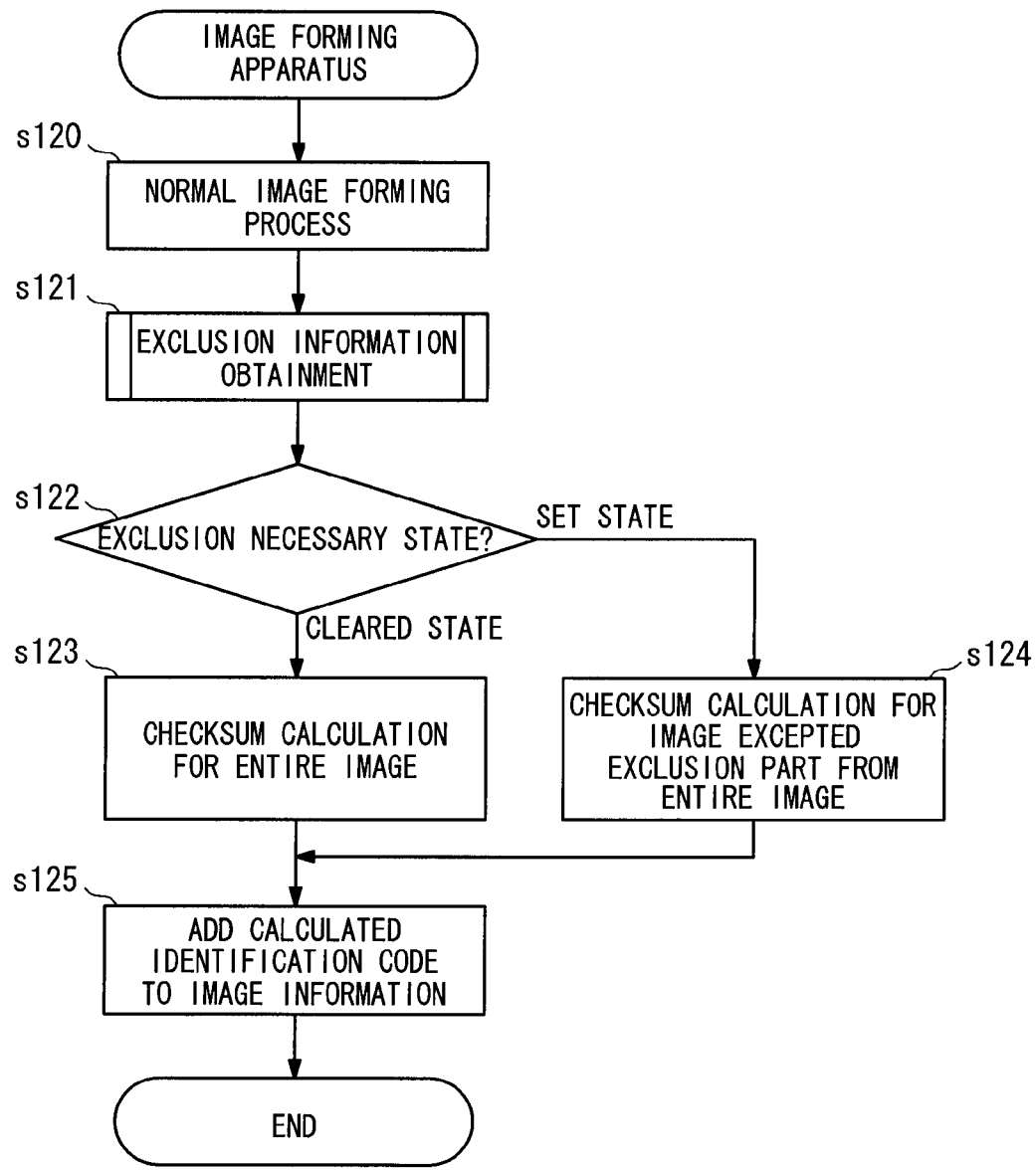
FIG. 13 is a flow chart showing the procedure of an image forming process.

Next, the above image forming process (Steps s102, s107) is described in detail based on a flow chart of FIG. 13.

First, a normal image forming process is performed (Step s120) and the exclusion information added to the image data is obtained (Step s121). Whether or not exclusion is necessary is determined from the exclusion information (Step s122). If the exclusion is not necessary and an exclusion necessary state is cleared (Step s122, NO), a checksum calculation is performed for the entire image (Step s123), a calculated identification code is added to attribute information of the sheet (Step s125) and this process is finished. If it is determined that the exclusion is necessary in Step s122 (Step s122, YES), the exclusion necessary state is set and the checksum calculation is performed for the image excepted an image part necessary to be excluded (Step s124) from the entire image and the calculated identification code is added to the attribute information of the sheet (Step s125) and this process is finished.

Figure 14:
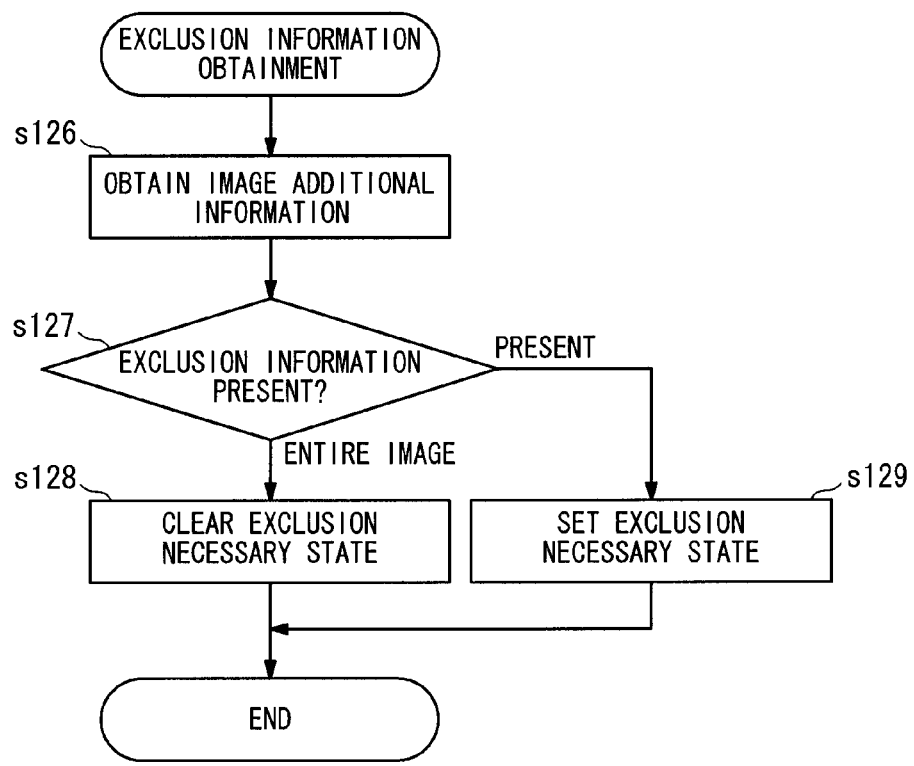
FIG. 14 is a flow chart showing the process of obtaining exclusion information.

The procedure of obtaining the exclusion information in the above procedure is described based on a flow chart of FIG. 14.

First, the image additional information is obtained (Step S126).

After the image additional information is obtained, whether or not the image additional information includes the exclusion information is determined (Step s127). If the presence of the exclusion information is determined (Step s127, present), the exclusion necessary state is set (Step s129), and this process is finished. If the absence of the exclusion information is determined (Step s127, entire image), the entire image becomes a target, the exclusion necessary state is cleared (Step s128), and this process is finished.

Figure 15:
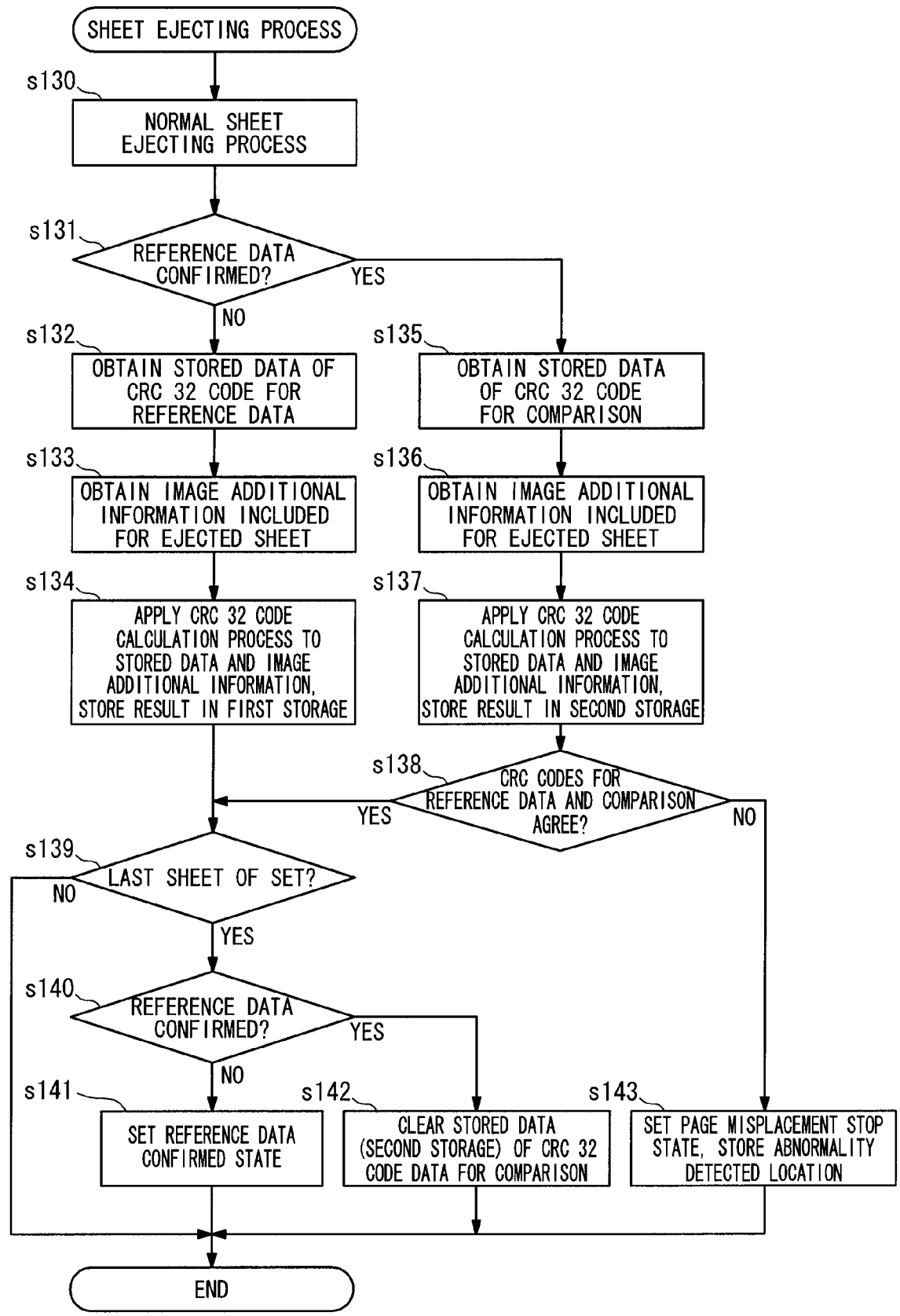
FIG. 15 is a flow chart showing the procedure of a sheet ejecting process.

Next, the above sheet ejecting process (Steps s103, s108) is described in detail based on a flow chart of FIG. 15.

First, a normal sheet ejecting process is performed (Step s130) and whether or not reference data for image comparison is already confirmed is determined (Step s131).

Unless the reference data is already confirmed (Step s131, NO), a CRC 32 code for reference data is read and obtained from the system memory 115 where this code data is stored (Step s132). For the first page, the code data is not stored and, therefore, not read. Subsequently, the image additional information included for the ejected sheet is obtained (Step s133). The stored data obtained in Step s132 and the image additional information, here, the identification code calculated in the image forming process are subjected to the CRC 32 code arithmetic processing and the arithmetic processing result is stored in the predetermined area of the system memory 115 as the first storage (Step s134). Subsequently, whether or not the ejected sheet is the last sheet of the set is determined (Step s139).

If the reference data is already confirmed in Step s131 (Step s131, YES), a reference data CRC 32 code for comparison is read and obtained from the system memory 115 where this code data is stored (Step s135). For the first page, the code data is not stored and, therefore, not read. Subsequently, the image additional information included for the ejected sheet is obtained (Step s136), the stored data obtained in Step s135 and the image additional information, here, the identification code calculated in the image forming process are subjected to the CRC 32 code arithmetic processing and the arithmetic processing result is stored in the predetermined area of the system memory 115 as the second storage (Step s137). Subsequently, the CRC codes for reference data and comparison are read from the system memory 115 as the first storage and the second storage for the ejected sheet and whether or not the read codes agree is determined (Step s138). If the codes agree (Step s138, YES), whether or not the ejected sheet is the last sheet of the set is determined (Step s139). If the codes are determined to disagree as a result of the comparison (Step s138, NO), the page misplacement stop state is set (Step s143) and this process is finished, assuming that this page is misplaced.

Unless the ejected sheet is determined to be the last sheet of the set (Step s139, NO), this process is finished.

If the ejected sheet is the last sheet of the set (Step s139, YES), whether or not the reference data is already confirmed is determined (Step s140). Unless the reference data is already confirmed (Step s140, NO), the reference data confirmed state is set (Step s141), and this process is finished. If the reference data is already confirmed (Step s140, YES), the data of the CRC 32 code for comparison stored in the system memory 115 as the second storage is cleared (Step s142) and this process is finished.

Figure 16:
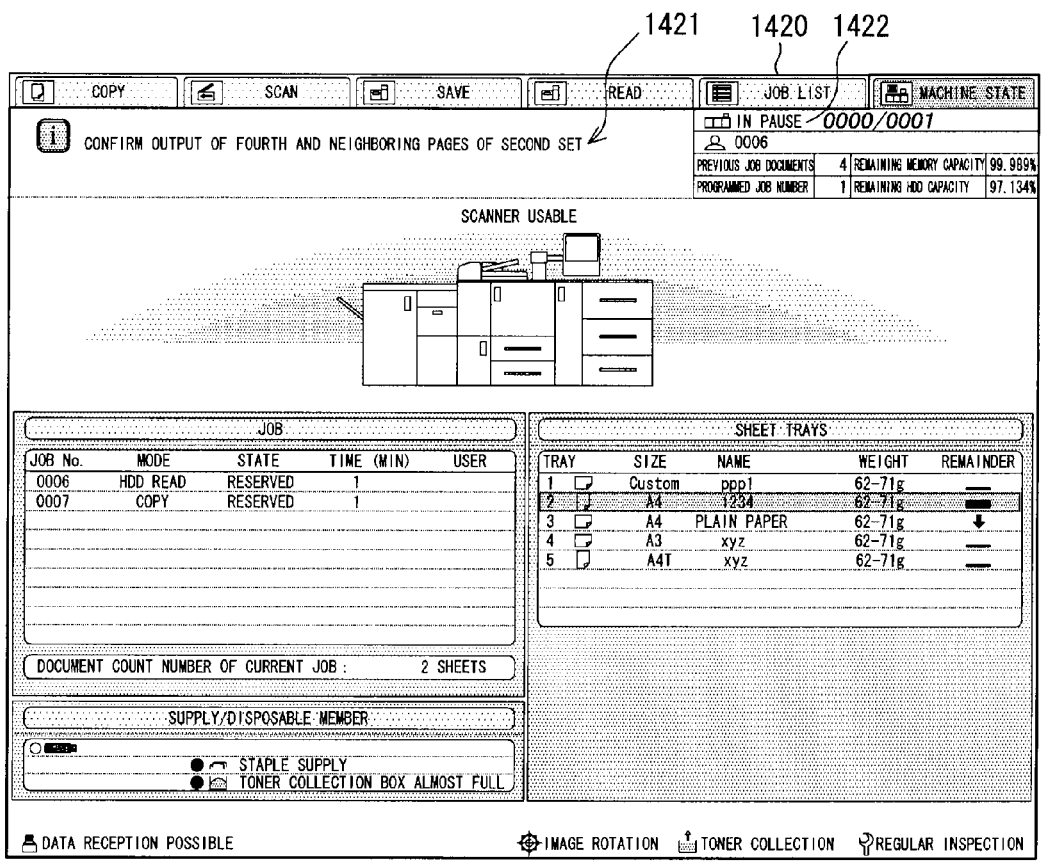
FIG. 16 is a view showing an example of a screen displaying page misplacement by the page.

FIG. 16 shows a display screen 1420 displaying a message in case of page misplacement when the above determination is performed page by page and the page misplacement is determined. The display screen 1420 can be displayed on the operation unit 140 or the like. The display screen 1420 includes a message field 1421 and a message directs attention to which pages of which set should be confirmed. This is because the location of the page misplacement can be more specifically known since the determination is made page by page.

Further, it is indicated in a state display field 1422 on the display screen 1420 that the image forming apparatus is stopped.

Although the above embodiment has been described for the present invention, the present invention is not limited to the contents of the above embodiment and appropriate changes can be made without departing from the scope of the present invention.

The invention claimed is:

1. An image forming apparatus for outputting a plurality of sets of output units, each output unit that is composed of a plurality of pages with a determined order being one set, and the apparatus comprising:
   an image forming unit for successively forming respective images corresponding to the plurality of pages on a plurality of sheets;
   a control unit for performing an arithmetic processing of an image eigenvalue calculated with a part of the image excluded for each output unit;
   a first storage for storing a result of the arithmetic processing performed for one specific set out of the plurality of sets of output units; and
   a second storage for storing a result of the arithmetic processing performed for an nth set out of the plurality of sets of output units;
   wherein the control unit determines whether or not the images are normally formed on the plurality of sheets for the nth set based on a comparison result between the result of the arithmetic processing stored in the first storage and the result of the arithmetic processing stored in the second storage.

2. The image forming apparatus according to claim 1, further comprising an eigenvalue calculation unit for calculating the image eigenvalue of each of the images with the part of the image excluded at a time of image formation or before the image formation.

3. The image forming apparatus according to claim 1, wherein the control unit performs the arithmetic processing based on the order of the image eigenvalues.

4. The image forming apparatus according to claim 1, further comprising an image data storage for storing image data corresponding to each of the plurality of pages, wherein the control unit repeatedly reads the image data from the image data storage a designated number of times in outputting the plurality of sets.

5. The image forming apparatus according to claim 1, wherein the control unit performs the arithmetic processing set by set, compares the result of the arithmetic processing stored in the first storage and the result of the arithmetic processing stored in the second storage after output of the nth set is finished, and determines whether or not the images are normally formed on the sheets for the nth set.

6. The image forming apparatus according to claim 1, wherein the control unit performs the arithmetic processing page by page, compares the result of the arithmetic processing stored in the first storage and the result of the arithmetic processing stored in the second storage after output of a specified page of the nth set is finished, and determines whether or not the image is normally formed on the sheet for the specified page of the nth set.

7. The image forming apparatus according to claim 1, wherein the part of the image to be excluded is a variable image added to an original image.

8. The image forming apparatus according to claim 1, wherein the result of the arithmetic processing stored in the first storage is the result of the arithmetic processing performed for a first set at a time of image formation, and the result of the arithmetic processing stored in the second storage is the result of the arithmetic processing for a second or later set at the time of the image formation.

9. The image forming apparatus according to claim 1, wherein the result of the arithmetic processing stored in the first storage and the result of the arithmetic processing stored in the second storage are the results of the arithmetic processings performed for the output units between two successive sets.

10. The image forming apparatus according to claim 1, wherein the result of the arithmetic processing stored in the first storage is an image reference eigenvalue stored in advance before image formation and the result of the arithmetic processing stored in the second storage is the result of the arithmetic processing for each output unit from a first set at a time of the image formation.

11. The image forming apparatus according to claim 2, further comprising a printer controller for receiving data for images and processing the received data into image data for printing;
   wherein the eigenvalue calculation unit determines the part of the image to be excluded based on image additional information of each page notified from the printer controller.

12. The image forming apparatus according to claim 1, further comprising an operation unit for receiving an operation input, wherein the operation unit is capable of designating the part of image to be excluded.

13. The image forming apparatus according to claim 1, wherein the part of the image to be excluded is determined by designating a coordinate position on a plane of the image before exclusion or any of divided images obtained by dividing the image before exclusion.

14. The image forming apparatus according to claim 1, wherein the control unit performs an abnormality processing when an image is determined not to be normally formed.

15. An image forming system, comprising:
   an image forming apparatus for outputting a plurality of sets of output units, each output unit that is composed of a plurality of pages with a determined order being one set, and the image forming apparatus including an image forming unit for successively forming respective images corresponding to the plurality of pages on a plurality of sheets;
   an external apparatus configured to transmit an image corresponding to each of a plurality of pages with a determined order;
   a network to which the image forming apparatus and the external apparatus are connected; and
   an eigenvalue calculation unit for calculating an image eigenvalue with a part of the image excluded for each of the images;
   wherein the image forming apparatus includes a control unit for performing an arithmetic processing of the image eigenvalue for each output unit, a first storage for storing a result of the arithmetic processing performed for one specific set out of the plurality of sets of output units, and a second storage for storing a result of the arithmetic processing performed for an nth set out of the plurality of sets of output units; and
   wherein the control unit determines whether or not the images are normally formed on the plurality of sheets for the nth set based on a comparison result between the result of the arithmetic processing stored in the first storage and the result of the arithmetic processing stored in the second storage.

16. The image forming system according to claim 15, wherein the eigenvalue calculation unit is provided in one of the external apparatus and the image forming apparatus.

17. The image forming system according to claim 15, wherein the external apparatus is configured to transmit the image added with a variable image and to transmit attribute information of the page together with the image.

18. The image forming system according to claim 17, wherein image additional information of each page includes information on the part of image to be excluded or information on the image eigenvalue.

19. The image forming system according to claim 15, further comprising an operation unit configured to designate the part of the image to be excluded upon receiving an operation input, the operation unit being provided in one of the external apparatus and the image forming apparatus.

20. A non-transitory computer readable recording medium storing a control program thereon for an image forming apparatus to cause a computer for controlling the image forming apparatus to output a plurality of sets of output units, each output unit that is composed of a plurality of pages with a determined order being one set, and the program being executable to control the computer to perform functions comprising:

successively forming respective images corresponding to the plurality of pages on a plurality of sheets;

performing an arithmetic processing of an image eigenvalue calculated with a part of the image excluded for each output unit;

storing a result of the arithmetic processing performed for one specific set out of the plurality of sets of output units in a first storage;

storing a result of the arithmetic processing performed for an nth set out of the plurality of sets of output units in a second storage; and determining whether or not the images are normally formed on the plurality of sheets for the output units of the nth set based on a comparison result between the result of the arithmetic processing stored in the first storage and the result of the arithmetic processing stored in the second storage.

21. The non-transitory computer readable recording medium according to claim 20, wherein the control program is executable to control the computer to perform a further function comprising calculating the image eigenvalue with the part of the image excluded for each of the images at a time of image formation or before the image formation.

* * * * *